United States Patent [19]

Taurin et al.

[11] Patent Number: 4,659,875
[45] Date of Patent: Apr. 21, 1987

[54] ELECTRONIC SYSTEM FOR THE SECRET TRANSMISSION OF AUDIO SIGNALS

[75] Inventors: Michel Taurin, Cachan; Jean-Michel Pernot, Fontenay-Aux-Roses; Gérard J. M. Marie, Santeny-Villecresnes, all of France

[73] Assignee: La Radiotechnique, Suresnes, France

[21] Appl. No.: 460,418

[22] Filed: Jan. 24, 1983

[30] Foreign Application Priority Data

Jan. 29, 1982 [FR] France ................................ 82 01462

[51] Int. Cl.⁴ ............................................. H04M 1/70
[52] U.S. Cl. ........................................ 380/19; 380/20; 380/21; 380/38; 380/48
[58] Field of Search ............................ 455/27, 29, 26; 375/2.2; 358/121, 124, 114; 179/1.5 FS, 1.5 R, 1.5 S

[56] References Cited

U.S. PATENT DOCUMENTS

| | | | |
|---|---|---|---|
| 1,502,889 | 7/1924 | Van Der Bül | 179/1.5 FS |
| 2,407,259 | 9/1946 | Dickieson | 179/1.5 R |
| 3,610,828 | 10/1971 | Girard et al. | 179/1.5 S |
| 3,777,064 | 12/1973 | Allen | 179/1.5 R |
| 4,159,399 | 6/1979 | Asakawa | 179/1.5 R |
| 4,188,506 | 2/1980 | Schmid | 179/1.5 R |

OTHER PUBLICATIONS

"Transmission Systems for Communications", Members of the Technical Staff, Bell Telephone Laboratories, 1971, pp. 97, 125-127.

Primary Examiner—S. C. Buczinski
Assistant Examiner—Aaron J. Lewis
Attorney, Agent, or Firm—Thomas A. Briody; Jack Oisher; William J. Streeter

[57] ABSTRACT

System for the secret transmission of audio signals having at one end a coding arrangement comprising an input low-pass filter which selects the secret audio signals to be transmitted, two parallel signal paths at the output of this filter, each path having a modulator of the phase-inverting type and a further low-pass filter, a stage for generating two modulation signals of the frequencies $F_1$ and $F_2$ and a first change-over switch which alternately switches through the output of the two paths in dependence of the state of a binary quasi-random signal, the encoded audio signals to be transmitted being available at the output of the change-over switch, and in which at the other end there is a decoding arrangement comprising a stage for regenerating the modulation signals of the said frequencies $F_1$ and $F_2$, a second change-over switch which alternately switches through one of these two modulation signals in dependence on the state of a binary quasi-random signal which is synchronized with the binary quasi-random signal used in the coding arrangement, followed by a demodulator for the audio signals and a low-pass filter for selecting the decoded audio signals.

14 Claims, 17 Drawing Figures

ELECTRONIC SYSTEM FOR THE SECRET TRANSMISSION OF AUDIO SIGNALS

BACKGROUND OF THE INVENTION

The present invention relates to a system for the secret transmission of audio signals, comprising a coding arrangement, at least one transmission channel and a decoding arrangement.

From U.S. Pat. No. 3,610,828, (Technical Communications) filed on May 23rd, 1967 and granted on Oct. 5, 1971, it is known to code analog audio signals by modifying fragments of these signals, more specifically by either inverting or not inverting these fragments, depending on the polarity of a binary digital signal.

However, a person with comparatively simple equipment, for example a function generator and a demodulation arrangement, is capable of regaining the encoded message in original form and consequently the system offers a very limited secrecy of the transmission.

SUMMARY OF THE INVENTION

The invention has for its object to provide a transmission system which is clearly more resistant to fraudulous or unauthorized decoding than systems such as described in the above-mentioned Patent.

According to the invention a transmission system of the type described in the opening paragraph is characterized in that (A) the coding arrangement comprises the following circuits:
 (a) an input low-pass filter;
 (b) two parallel signal paths at the output of this filter, each comprising a modulator and a low-pass filter connected thereto, each modulator comprising two parallel amplifiers having a gain factor equal to +1 and −1, respectively, and a change-over switch which alternately connects the output of the amplifier having the gain factor +1 and the output of the amplifier having the gain factor −1 to the input of the low-pass filter in dependence on the state of a binary modulation signal with frequency $F_1$ for one modulator and of a binary modulation signal with frequency $F_2$ for the other modulator,
 (c) a stage for generating the two modulation signals of the frequencies $F_1$ and $F_2$;
 (d) a first change-over switch which alternately switches through, one of the outputs of the two signal paths in dependence on the state of the binary signal applied to this change-over switch from a first stage which produces binary quasi-random signals, the encoded audio signals to be transmitted being available at the output of this change-over device;
(B) the decoding arrangement comprises the following circuits:
 (e) a stage for recovering the modulation signals of the frequencies $F_1$ and $F_2$.
 (f) a second change-over switch which alternately switches through, one of the modulation signals of the frequencies $F_1$ and $F_2$ in dependence on the stage of a binary signal applied to this change-over switch from a second stage generating said binary quasi-random signals, which stage is synchronized with the corresponding stage of the coding arrangement;
 (g) a demodulator comprising two parallel amplifiers having gain factors equal to +1 and −1, respectively, to which the received, encoded audio signals are applied, and a change-over switch to which the output signal of the second change-over switch is applied and which alternately connects the output of the amplifier having the gain factor +1 and the output of the amplifier having the gain factor −1 to the input of an output low-pass filter, in dependence on the state of the signals at the output of this second change-over switch, the decoded audio signals at the output of the output low-pass filter corresponding to the original audio signals.

So with a transmission system of such a type the base spectrum of the original signals to be encoded is modulated on a modulation frequency which is alternately chosen from two possible frequency values $F_1$ and $F_2$, the transition from one to the other frequency value being controlled by a quasi-random sequence in the form of, for example, a special code. In order to prevent the encoded signals from being demodulated by one of these two frequencies $F_1$ and $F_2$ or by an intermediate frequency located between $F_1$ and $F_2$, their values must be spaced apart approximately 1 kHz or more. In these circumstances the scrambled sound signals are now completely resistant to unauthorized descrambling, the encoded message is absolutely unintelligible and cannot be restored.

DESCRIPTION OF THE DRAWINGS

The invention will now be further described by way of example with reference to the accompanying drawings.

DESCRIPTION OF THE PREFERRED EMBODIMENT

Figure 1:
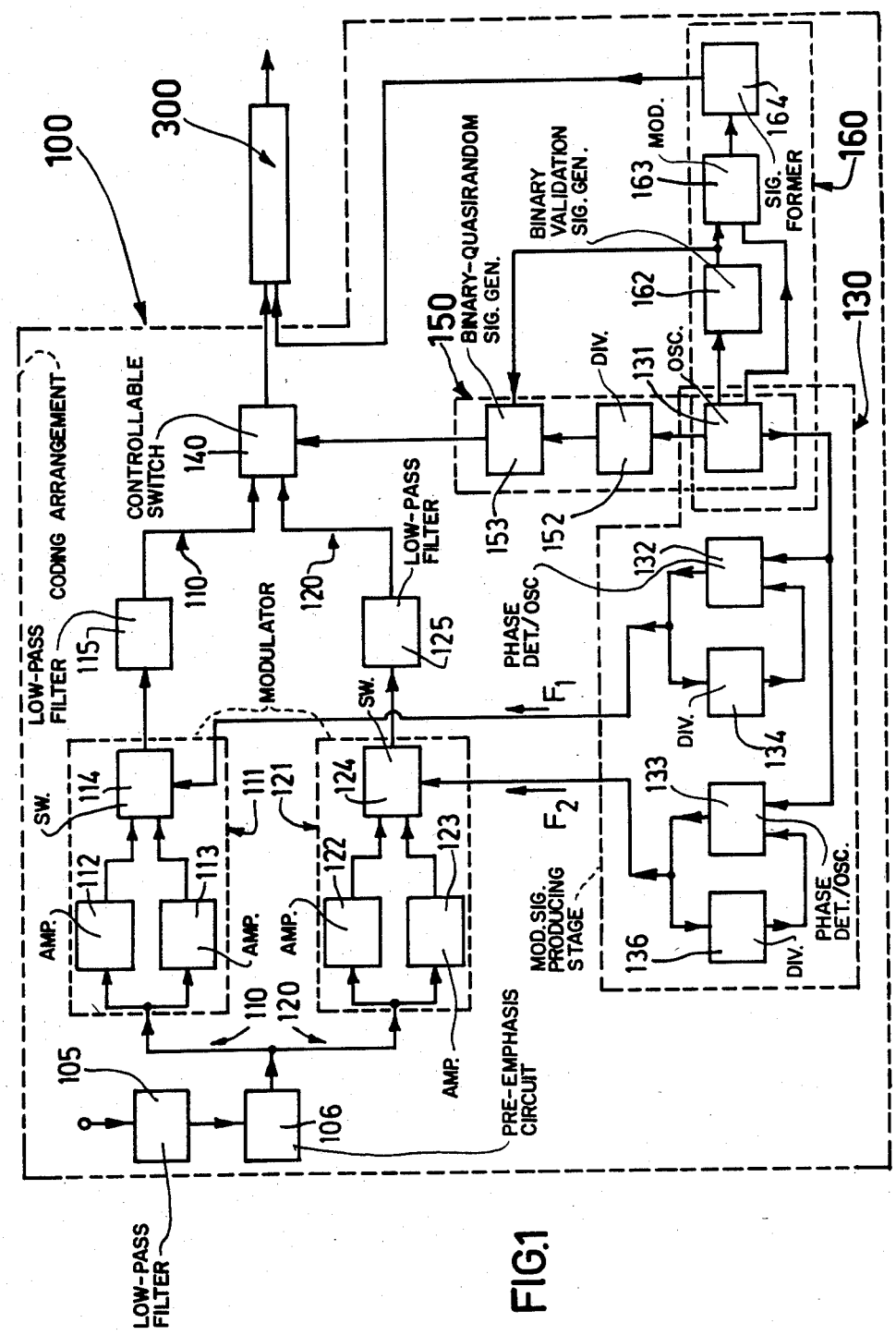
FIG. 1 shows an embodiment of the coding arrangement in the transmission system in accordance with the invention.
Figure 6:
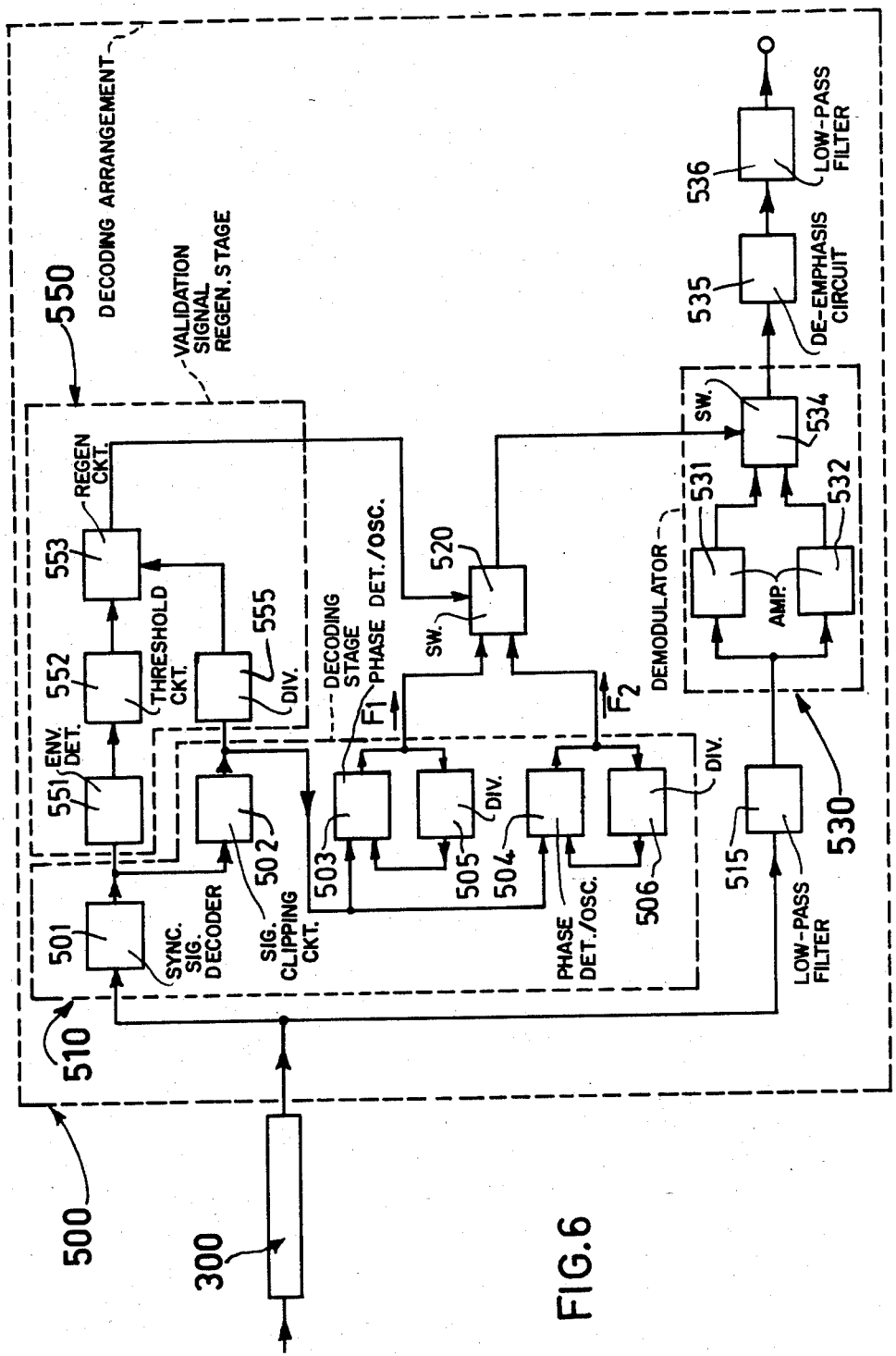
FIG. 6 shows an embodiment of the decoding arrangement in the transmission system in accordance with the invention.

The electronic system for the secret transmission of audio signals described herebelow with reference to the Figures comprises a coding arrangement 100, shown in FIG. 1, at least one transmission channel 300 and a decoding arrangement 500, which is shown in FIG. 6.

The coding arrangement 100 itself comprises successively connected an input low-pass filter 105 receiving the audio signals to be secretly transmitted, two parallel signal paths 110 and 120 comprising modulators 111 and 121, respectively, and low-pass filters 115 and 125, respectively. A controllable switching arrangement 140 switches the output signal of one signal path or the input signal of the other signal path and consequently the encoded audio signals to be transmitted through to the output of the coding arrangement 100. Each of two modulators (111, 121) comprises two parallel amplifiers (112, 113) or (122, 123), respectively, the amplifiers 112 and 122 having a gain factor +1 and the amplifier 113 and 123 having a gain factor −1, and a change-over switch 114 or 124 which alternately connect in each modulator the output of the amplifier having the gain factor +1 or the output of the amplifier having the gain factor −1 to the low-pass filter 115 or 125 in dependence on the polarity of a digital signal of the frequency $F_1$ for the first modulator 111 and of the frequency $F_2$ for the second modulator 121.

Figure 2:
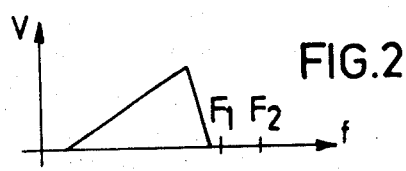
FIG. 2 shows an example of the spectrum of the output signal of the input low-pass filter of this coding arrangement.

The input low-pass filter 105 is intended to prevent foldover of the spectrum from occurring and for that purpose highly attenuates all frequencies larger than the lowest of the two modulation frequencies $F_1$ and $F_2$ (see FIG. 2). The cut-off frequency of this filter must be lower than the lowest of these two frequencies $F_1$ and $F_2$ and the edge thereof must be steeper according as a larger transmission band is desired. For example, when using a $7^{th}$ order Cauer filter, the cut-off frequency of the encoding arrangement as a whole and decoding arrangement can be chosen at a very high value, so that the transmission band is large. The input audio signals filtered thus may thereafter be subjected to a preemphasis in a circuit 106, of the order of, for example, 75 microseconds, which furnishes the following three advantages: overloading of the transmission channel 300 at high frequencies is prevented from occurring because of the fact that the base spectrum for the first low side band of the modulated frequency spectrum is inverted, attenuation of the switching noise which may be produced when the phase of the decoding arrangement 500 is not accurately synchronized with the coding arrangement 100, improving the signal-to-noise ratio of the coding arrangement and the decoding arrangement as a whole.

The output signal of the input low-pass filter 105—or the pre-emphasis circuit 106 if provided between this filter and the input of the two parallel paths 110 and 120—is then applied to the two (amplitude) modulators 111 and 121, which are of the phase-inverting type. Using the analog change-over switch 114 or 124, respectively, which are controlled by the digital signal having the demodulation frequency $F_1$ or $F_2$, respectively, it is possible in the modulator 111 or 121, respectively to switch through the output of one of the amplifiers 112, 113 (having the respective gain factors +1 and −1) or 122, 123, respectively, in dependence on the occurrence of, for example, the "high" state in the digital signal having the frequency $F_1$ or $F_2$, respectively.

Figure 3A:
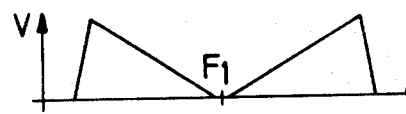
FIGS. 3a and 3b show the spectrum of the output signals of the two modulators.
Figure 3B:
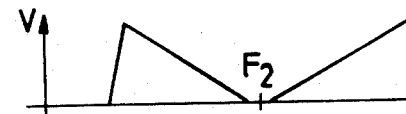
Figure 5A:
FIGS. 5a to 5d, inclusive, show the output signals of the different circuits of the stage for forming a synchronizing signal.
Figure 5B:
Figure 5C:
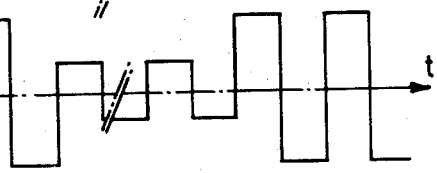
Figure 5D:
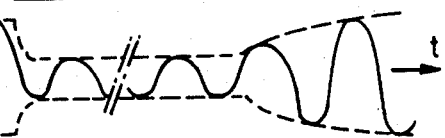

The inversion of the base spectrum and the presence of further lower and higher sidebands (see FIGS. 3a and 3b where the spectra are shown asymmetrically to stress the fact that base spectrum inversion is involved) around the successive frequencies $3F_1$, $5F_1$, etc. in the spectrum of the output signal of the modulator 111, or the successive frequencies $3F_2$, $5F_2$, etc. in the spectrum of the output signal of the modulator 121 necessitate the use of low-pass filters 115 and 125 at the outputs of the modulators 111 and 121, respectively, for eliminating, in each of these two cases, the unwanted bands which are located higher than the desired first low sideband of the modulated spectrum. For this purpose, filters can be used whose edge is sufficiently steep at the cutoff frequency to obtain one single sideband which comprises almost the entire audio spectrum, for example $7^{th}$ order Cauer filters.

So in each signal path the input audio signals are amplitude modulated on carrier frequencies $F_1$ or $F_2$, respectively, by modulating the input audio signals with a rectangular signal with frequency $F_1$ or $F_2$ and by thereafter filtering the modulation product such that only the lower sideband of the spectrum is retained and finally by switching through the output signal of one of the signal paths 110 and 120 to the output of the coding arrangement 100 by means of the inverter arrangement 140 according to the state of a binary quasi-random signal being applied to this inverter arrangement 140 from a binary quasi-random signal producing stage 150. The audio signals which are transmitted via the transmission channel 300 to the decoding arrangement 500, which will be described hereinafter, are available at the output of the inverter arrangement 140.

The two digital signals of the frequencies $F_1$ and $F_2$ are applied to the modulators 111 and 121, respectively, by a modulation signals producing stage 130, this stage comprising an oscillator 131 having an oscillator or pilot frequency $F_p$, followed by two parallel phase-locked loops (PLL) 132, 134 and 133, 136; these loops are used as frequency multipliers multiplying the pilot frequency of the oscillator 131, the phase-locked loop 132, 134 supplying the signal having the frequency $F_1$ which is applied to the modulator 111 and the phase-locked loop 133, 136 supplying the signal having the frequency $F_2$ which is a applied to the modulator 121. In an embodiment of the invention, the following frequency values are chosen: pilot frequency $F_p = 800$ Hz, modulation frequency $F_1 = F_p \times 14 = 11200$ Hz, modulation frequency $F_2 = F_p \times 16 = 12800$ Hz, the oscillator of the phase locked loop 132, 134 supplying the signal of the frequency $F_1$ being connected in known manner through a divide-by-14 divider 134 to the phase detector of the PLL and the oscillator of the loop 133, 136 supplying the signal of the frequency $F_2$ being connected in known manner through a divide-by-16 divider 136 to the phase detector of the PLL.

The stage 150, which produces the binary quasi-random signals, also comprises an oscillator, the oscillator 131 in the embodiment, followed by a divider 152 and a generator 153 for generating binary quasi-random signals by means of a coding key on receipt of so-called validation signals which are formed at random in known manner. The output signal of this generator 153 causes the inverter arrangement 140 to switch through the signal of signal path 110 or 120 in accordance with its polarity.

So as to ensure synchronization of the binary quasi-random signals produced by the decoding arrangement with those of the coding arrangement, a synchronizing signal producing stage 160 is provided. This signal is obtained by modulating the amplitude of an oscillator output signal by said validation signals. For that purpose the stage 160 comprises the oscillator 131, a circuit 162 for producing binary validation signals from the output signal of this oscillator 131 having the pilot frequency $F_p$, a modulator 163 for modulating the amplitude of the output signal of the oscillator 131, with said validation signals, as well as a signal former 164, whose output presents the synchronizing signal. Such circuit 162 is on itself known and may comprise (not shown) a divider with a dividing factor, which changes at random. Said synchronizing signal is then added to the encoded output audio signals supplied by the inverter arrangement 140 for forming a composite signal, which is applied to the transmission channel 300.

Figure 4:
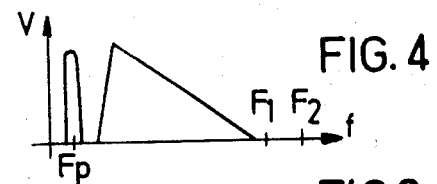
FIG. 4 shows the spectrum of the coding arrangement output signal applied to the input of the transmission channel.

FIG. 4 shows in solid line the spectrum of the output signal of the coding arrangement 100 with the frequency band which corresponds to the encoded audio signals when the signal of signal path 110 is switched through, and also, below this frequency band the frequency band which corresponds to the modulated pilot frequency $F_p$, while the FIGS. 5a to 5d, inclusive, show, respectively, the output signal of the oscillator 131, that of the validation signal producing circuit 162, that of the modulator 163 and that of the signal former 164.

Conversely, in the decoding arrangement 500 shown in FIG. 6, the encoded audio signals and the synchronizing signals are recovered from the composite signal at the output of the channel 300. To that end the decoding arrangement 500 comprises an input low-pass filter 515 for processing the encoded audio signals. The encoded audio signals thus filtered are applied to a demodulator 530 which comprises two parallel amplifiers 531 and 532 having equal gain coefficients of $+1$ and $-1$, respectively and a change-over switch 534 which alternately connects the output of the amplifier 531 or the output of the amplifier 532, via a de-emphasis circuit 535, to a low-pass filter 536, the decoded audio signals which correspond to the input audio signals before scrambling being available at the output of the filter 536.

Figure 7A:
FIGS. 7a to 7c, inclusive, show the output signals in the coding arrangement in different places in the stage for recovering a synchronizing signal.

The decoding arrangement 500 further comprises a circuit 501 for decoding the synchronizing signal whose output signal, which is shown in FIG. 7a, is applied via a signal clipping circuit 502 to two phase-locked loops 503, 505 and 504, 506 which are arranged in parallel comprising a divider 505 and a divider 506, respectively. The circuits 501 to 506, inclusive, provide a stage 510 for decoding the signals having the frequencies $F_1$ and $F_2$. These signals are available at the output of the oscillators of the loops 503, 505 and 504, 506 and are applied to the two inputs of a change-over switch 520, which then selects either the signal having the frequency $F_1$ or the signal having the frequency $F_2$ depending on the state of the validation signal which is applied to this switch 520 by a validation signal regenerating stage 550.

Figure 8A:
FIGS. 8a and 8b show the spectrum of the two possible input signals of a demodulator.
Figure 8B:
Figure 9A:
FIGS. 9a and 9b show the two corresponding output signals of the demodulator.
Figure 9B:
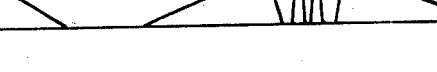

The output signal of the change-over switch 520 is applied to the demodulator 530 and controls the change-over switch 534 of the demodulator. The demodulation is actually realized by the multiplication of the selected encoded audio signals by one of the modulation frequencies $F_1$ and $F_2$ selected by the change-over switch 520, followed by a selection at the output of the demodulator 530 (in the filter 536) of the spectrum of the decoded audio signals, so that the noise signals having the frequencies $F_1 \pm F_p$ and $F_2 \pm F_p$ are eliminated. The FIGS. 8a and 8b show the spectrum of the two possible input signals of the demodulator 530, FIG. 8a showing the case in which the output signal of the change-over switch 520 is the signal having the frequency $F_1$ and FIG. 8b showing the case in which it is the signal having the frequency $F_2$. The FIGS. 9a and 9b show the corresponding spectra at the output of the demodulator 530, before the output low-pass filter 536.

Figure 7B:
Figure 7C:

Finally, the decoding arrangement 500 comprises, for the processing of the synchronizing signal, the binary quasi-random signal regenerating stage 550. This stage 550 comprises a circuit 551 for detecting the envelope, a threshold circuit 552 for regenerating the validation signals (FIGS. 7b and 7c show the output signals of these circuits 551 and 552, respectively) and a regenerator circuit 553 for regenerating the before-mentioned quasi-random signals. This regenerator circuit 553 is similar to the generator 153 of the coding arrangement 100 and derives in corresponding manner said binary quasi-random signals from the validation signals at the output of the circuit 552 on the one hand and the pilot frequency $F_p$ (which corresponds to the frequency of the oscillator 131) at the output of the clipping circuit 502 on the other hand. For that purpose, a frequency divider 555 is inserted between the circuit 502 and the regenerator circuit 553, which corresponds to the divider 152 in the coding arrangement 100.

The binary quasi-random signals at the output of the regeneration stage 550 are therewith synchronized with those at the output of the generator 153. As the output signal of the stage 550 controls the switching through of $F_1$ or $F_2$ to the change-over switch 520, a correct demodulation and descrambling of the encoded audio signals takes place in the demodulator 530.

It will be obvious that the present invention is not limited to the above-described and proposed embodiment but that variations of this embodiment can be proposed without departing from the scope of the invention.

It is possible, for example, to reverse the mutual positions of the encoded audio frequencies and of the modulated pilot frequency $F_p$ (which positions are shown in the FIGS. 4, 8a and 8b) by using for $F_p$ a frequency which is higher than $F_1$ and $F_2$. In that case the frequencies $F_1$ and $F_2$ may be obtained by first dividing $F_p$ by an integer k, and by multiplying $F_p/k$ thereafter by integers l and m.

It is, e.g., also possible to use dividers 152 and 555, which are mutually different, when the generator 153 and/or regenerating circuit 553 is suitably adapted thereto.

When the system in accordance with the invention is used in the field of coded television, wherein a television receiver is used and the decoding arrangement is consequently either included in the receiver or is simply connected to the receiver as an external module, the phase-locked loops of the stages 130 and 510 for producing the two modulation signals of the frequencies $F_1$ and $F_2$ need not be controlled by an additional pilot frequency $F_p$ but they may be controlled by, for example, the scanning or line frequency $F_T$. The generator 553 which supplies the binary quasi-random signals may then be synchronized by means of a validation signal, which is transmitted in the video signal and is used for scrambling the signal in question.

It is likewise possible to chose the propagation time of the encoded signals different from the propagation time of the pilot frequency $F_p$ or, in the event of television, from the scanning or line frequency $F_T$. At the moment a change-over from the frequency $F_1$ to the frequency $F_2$ and vice versa is effected, sudden phase changes which become manifest as switching noise appear in the decoded signals. The use of preemphasis premodulation and deemphasis postmodulation significantly reduces the intensity of this noise. Such switching noise is also less noticeable when a switching frequency of the order of some Hz or lower is used. If this noise is to be eliminated completely, the decoding arrangement may be provided with a device for controlling the propagation time of the pilot frequency $F_p$ or of the scanning or line frequency $F_T$, so that this propagation time corresponds to the propagation time of the encoded signals.

The system described so far uses one single transmission channel between the coding and decoding arrangements, but the invention is not limited thereto. The scrambling code may, for example, also be transmitted via a different transmission channel which is optionally separated from the transmission channel used for transmitting the encoded audio signals.

What is claimed is:

1. A system for the secret transmission of audio signals, comprising a coding arrangement, at least one transmission channel and a decoding arrangement, characterized in that:

(A) the coding arrangement comprises the following circuits:

(a) an input low-pass filter;

(b) two parallel signal paths at the output of this filter, each path comprising a modulator and a low-pass filter connected thereto, each modulator comprising two parallel amplifiers having a gain factor equal to $+1$ and $-1$, respectively and a change-over switch which alternately connects the output of the amplifier having the gain factor $+1$ and the output of the amplifier having the gain factor $-1$ to the input of the low-pass filter in dependence on the state of a binary modulation signal having the frequency $F_1$ for one modulator and the frequency $F_2$ for the other modulator, (c) a stage for generating the two modulation signals of the frequencies $F_1$ and $F_2$;

(d) a first change-over switch which alternately switches through one of the outputs of the two signal paths in dependence on the state of the binary signal applied to this change-over switch from a first stage for generating binary quasi-random signals the encoded audio signals to be transmitted being available at the output of this change-over switch;

(B) the decoding arrangement comprises the following circuits:

(e) a stage for recovering the modulation signals of the frequencies $F_1$ and $F_2$;

(f) a second change-over switch which alternately switches through one of the modulation signals of the frequencies $F_1$ and $F_2$ in dependence on the state of a binary signal applied to this change-over switch from a second stage for regeneration said binary quasi-random signals, which stage is synchronized with the corresponding stage of the coding arrangement;

(g) a demodulator comprising two parallel amplifiers having gain factors equal to $+1$ and $-1$, respectively to which the received, encoded audio signals are applied and a change-over switch to which the output signal of the said second change-over switch is applied and which alternately connects the output of the amplifier having the gain factor $+1$ and the output of the amplifier having the gain factor $-1$ to the input of an output low-pass filter in dependence on the state of the signals at the output of this second change-over switch, the decoded audio signals at the output of the output low-pass filter corresponding to the original audio signals.

2. A system as claimed in claim 1, characterized in that a preemphasis circuit is provided in the coding arrangement between the output of the input low-pass filter and the input of the two signal paths and that a deemphasis circuit is arranged in the decoding arrangement between the output of the demodulator and the input of the output low-pass filter.

3. A system as claimed in claim 1 characterized in that each of the stages for generating the two modulation signals having the frequencies $F_1$ and $F_2$ comprises an oscillator followed by two phase-locked loops for producing respectively the modulation signal of the frequency $F_1$ and the modulation signal of the frequency $F_2$ and that the stage for generating binary quasi-random signal comprises a generator for generating binary quasi-random signals on receipt of a validation signal being controlled by a coding key.

4. A system as claimed in claim 3, characterized by a transmission of a pilot frequency $F_p$ for recovering in the decoding arrangement signals of the frequencies $F_1$ and $F_2$, which are equal to multiples of $F_p$ or to a subharmonic of $F_p$ and by modulating the pilot frequency with a syncronizing signal which is received from a synchronizing signal producing stage included in the coding arrangement, this stage comprising an oscillator followed by an amplitude modulator and a pulse shaper.

5. A system as claimed in claim 3, which is suitable for use in the field of the so-called keyed transmission of television signals, comprising a television receiver, characterized in that the stages for producing the two modulation signals of the frequencies $F_1$ and $F_2$ comprise two phase-locked loops which are controlled by the scanning or line frequency $F_T$ for recovering the signal having the frequency $F_1$ and the signal having the frequency $F_2$, respectively and that a validation signal included in the signal is used on the one hand for keying the video signal and on the other hand for synchronizing the generator generating binary quasi-random signals in the coding arrangement with those in the decoding arrangement.

6. A system as claimed in claim 4 characterized in that an arrangement for controlling the propagation time of the pilot frequency $F_p$ or of the scanning or line frequency $F_T$ is provided in the decoding arrangement to eliminate or reduce switching noise.

7. A system as claimed in claim 5, characterized in that the decoding arrangement is included in the television receiver.

8. A system as claimed in claim 2, characterized in that each of the stages for generating the two modulation signals having the frequencies $F_1$ and $F_2$ comprises an oscillator followed by two phase-locked loops for producing respectively the modulation signal of the frequency $F_1$ and the modulation signal of the frequency $F_2$ and that the stage for generating binary quasi-random signal comprises a generator for generating binary quasi-random signals on receipt of a validation signal being controlled by a coding key.

9. A system as claimed in claim 8, characterized by a transmission of a pilot frequency $F_p$ for recovering in the decoding arrangement signals of the frequencies $F_1$ and $F_2$, which are equal to multiples of $F_p$ or to a subharmonic of $F_p$ and by modulating the pilot frequency with a synchronizing signal which is received from a synchronizing signal producing stage included in the coding arrangement, this stage comprising an oscillator followed by an amplitude modulator and a pulse shaper.

10. A system as claimed in claim 8, which is suitable for use in the field of the so-called keyed transmission of television signals, comprising a television receiver, characterized in that the stages for producing the two modulation signals of the frequencies $F_1$ and $F_2$ comprise two phase-locked loops which are controlled by the scanning or line frequency $F_T$ for recovering the signal having the frequency $F_1$ and the signal having the frequency $F_2$, respectively and that a validation signal included in the signal is used on the one hand for keying the video signal and on the other hand for synchronizing the generator generating binary quasi-random signals in the coding arrangement with those in the decoding arrangement.

11. A system as claimed in claim 9, characterized in that an arrangement for controlling the propagation time of the pilot frequency $F_p$ or of the scanning or line frequency $F_T$ is provided in the decoding arrangement to eliminate or reduce switching noise.

12. A system as claimed in claim 5, characterized in that an arrangement for controlling the propagation time of the pilot frequency $F_p$ or of the scanning or line frequency $F_T$ is provided in the decoding arrangement to eliminate or reduce switching noise.

13. A system as claimed in claim 10, characterized in that an arrangement for controlling the propagation time of the pilot frequency $F_p$ or of the scanning or line frequency $F_T$ is provided in the decoding arrangement to eliminate or reduce switching noise.

14. A system as claimed in claim 10, characterized in that the decoding arrangement is included in the television receiver.

* * * * *

UNITED STATES PATENT AND TRADEMARK OFFICE
CERTIFICATE OF CORRECTION

PATENT NO. : 4,659,875

DATED : April 21, 1987

INVENTOR(S) : Michel Taurin, et al

It is certified that error appears in the above-identified patent and that said Letters Patent is hereby corrected as shown below:

Claim 2. line 5    change "deemphasis" to --de-emphasis--

Signed and Sealed this

Twenty-seventh Day of December, 1988

Attest:

DONALD J. QUIGG

*Attesting Officer*    *Commissioner of Patents and Trademarks*